March 15, 1927.

L. H. PETER 1,620,781

ALTERNATING CURRENT RELAY

Filed July 15, 1925  3 Sheets-Sheet 1

INVENTOR:
L. H. Peter,
BY
A. L. Vencill
ATTORNEY

Patented Mar. 15, 1927.

1,620,781

UNITED STATES PATENT OFFICE.

LESLIE HURST PETER, OF KING'S CROSS, LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

ALTERNATING-CURRENT RELAY.

Application filed July 15, 1925. Serial No. 43,773, and in Great Britain November 1, 1924.

My invention relates to alternating current relays of the induction type, in which the torque exerted upon the vane or other movable element of the relay is due to the cooperation of two magnetic fluxes traversing the vane or other element and generated by separate energizing windings to which alternating currents of suitable different phase are supplied.

My invention has for its object to provide an improved relay of the above character which shall be unresponsive to alternating current of a predetermined frequency supplied to either or both of the relay windings, and effectively responsive to alternating current of another different frequency supplied to both windings, thus providing a two-element relay which is selective in operation as regards the frequency of the energizing current supplied thereto.

According to my present invention the magnetic system of the relay comprises two distinct sets of poles each of these sets comprising poles adapted to produce a torque upon the vane or movable element as above described, the torque due to one set of poles being arranged to be opposite to that due to the other set.

The magnetic characteristics of the two sets of poles are such as to render one of these sets predominant as regards exerting torque upon the movable element and the magnetic fluxes traversing the two sets of poles and causing opposite torques upon the movable element are arranged to be substantially equal to one another for the particular frequency of energizing current below which it is desired that the relay shall be unresponsive by reducing the flux traversing the set of poles which would otherwise predominate as above explained, by providing shading bands or conductors surrounding one or more of the poles of the set. For energizing currents of higher frequencies than the predetermined frequency it will be evident that the predominance of one set of poles over the other will be reversed since the shading bands or conductors will be more effective in opposing the magnetic flux of the otherwise predominant set of poles.

My invention is particularly applicable to alternating current relays employed in track signaling systems for railways and the like in which one of the co-operating magnetic fluxes of each set of poles is due to current supplied directly from the track circuit, the other flux being due to alternating current independently supplied from any suitable source so that a reversal in the torque exerted upon the movable element of the relay is effected by reversing the phase of the current supplied from the track circuit or from the source above referred to.

My invention is illustrated by way of example in the accompanying drawings, as embodied in a signaling relay of the above character.

Figure 1:
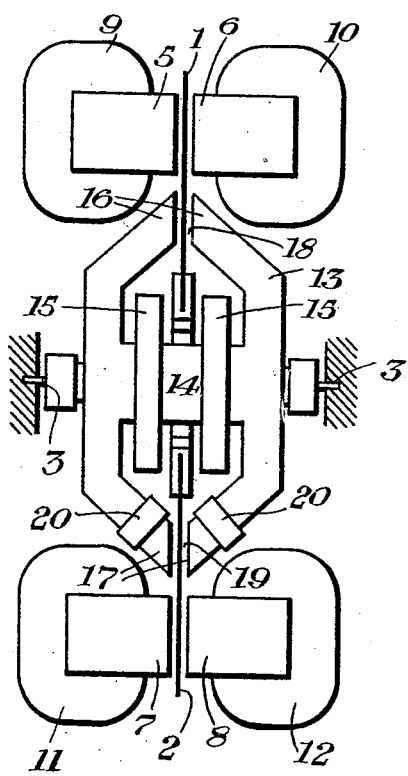
Figs. 1 and 2 are somewhat diagrammatic views in side and front elevation respectively of one form of relay.
Figure 2:
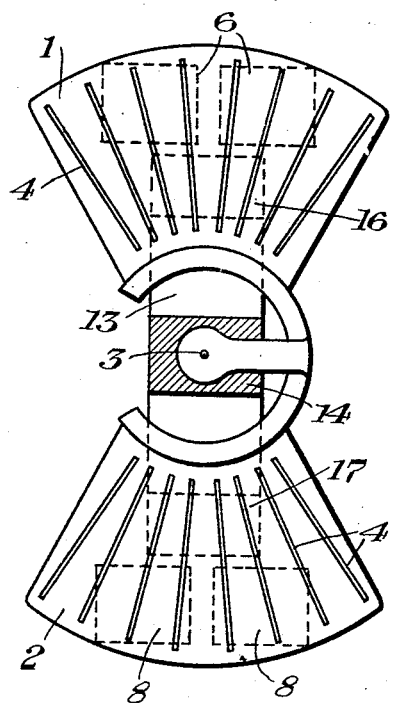

Referring now first to the relay shown in Figs. 1 and 2 it will be seen that the movable element of the relay comprises two diametrically opposite vane segments 1, 2 mounted upon a common spindle 3, and each provided with radial slots 4 for the purpose of defining the path of the currents induced in the vanes 1, 2. Each vane segment is traversed at or near its outer edge by magnetic fluxes due to two pairs of oppositely arranged poles 5, 6 and 7, 8. The pair of poles 5 is formed on a common magnetic core surrounded by an energizing winding 9, each of the other pairs of poles 6, 7 and 8 being similarly formed on a magnetic core provided with an energizing winding indicated at 10, 11 and 12, respectively. The windings 9, 10, 11 and 12 of these cores, which will hereinafter be termed the local cores, are connected in series or parallel with one another to a source of signaling current which may, for instance, be constituted by transmission conductors to which alternating current for signaling purposes is supplied. Centrally arranged with reference to the axis of rotation of the vane segments 1, 2 is another magnetic core 13, hereinafter termed the track core, which is constituted by a common yoke 14 provided with energizing windings 15 and two pairs of poles 16 and 17 arranged opposite to one another, at the two sides of the vane segments 1, 2 and nearer the center of rotation than the poles 5, 6, 7 and 8 of the local cores. The vane segments 1, 2 are thus each traversed by three magnetic fluxes of which the two radially outer fluxes traverse the poles 6 and 8 of the local cores and the radially inner fluxes traverse the poles 16, 17 of the track core.

The air gap 18 between the poles 16 of the track core in the case of the vane segment 1 is arranged to be substantially greater than the air gap 19 between the poles 17 of the track core at the other segment 2, the latter poles, being surrounded by shading bands or conductors 20.

Apart from the action of the shading bands or conductors 20 it will be evident that the set of poles 17 including the smaller air gap 19 will exert a greater torque upon the corresponding vane segment 2 and the torques on the two vane segments 1, 2 being arranged to be opposite to one another, the torque exerted upon the vane segment 2 will predominate over the torque exerted upon the other vane segment 1. This predominance is, however, arranged to be neutralized by the provision of the shading bands or conductors 20 the action of which at the frequency below which it is desired that the relay shall be unresponsive causes the opposing torques exerted upon the vane segments 1, 2 to be substantially equal, the dimensions of the air gaps 18, 19 and the conductivity of the shading bands or conductors 20 being suitably proportioned for this purpose in a manner which will be obvious to those skilled in the art.

It will thus be clear that when energizing currents of the predetermined frequency are supplied to the windings 15, 9, 10, 11 and 12 of the track and local cores the opposing torques upon the vane segments 1, 2 will be substantially balanced, and the relay will therefore be unresponsive, the predetermined frequency being, for instance, that of the propulsion current of an electric railway operated by alternating current. When, however, an alternating current of a higher frequency such as will in these circumstances be employed for signaling purposes is supplied to the energizing windings of the track and local cores the action of the shading bands or conductors 20 will be correspondingly increased, and the torque exerted upon the vane segment 1 interposed in the larger air gap 18 will predominate over the torque exerted on the other vane segment 2, so that the relay will respond to current of the signaling frequency and actuate relay contacts in the usual manner.

It will be understood that by reversing the phase of the current supplied to the windings 15 of the track core a reversal in the direction of the predominant torque will be effected, so that the relay will operate as a three-position relay.

Figure 3:
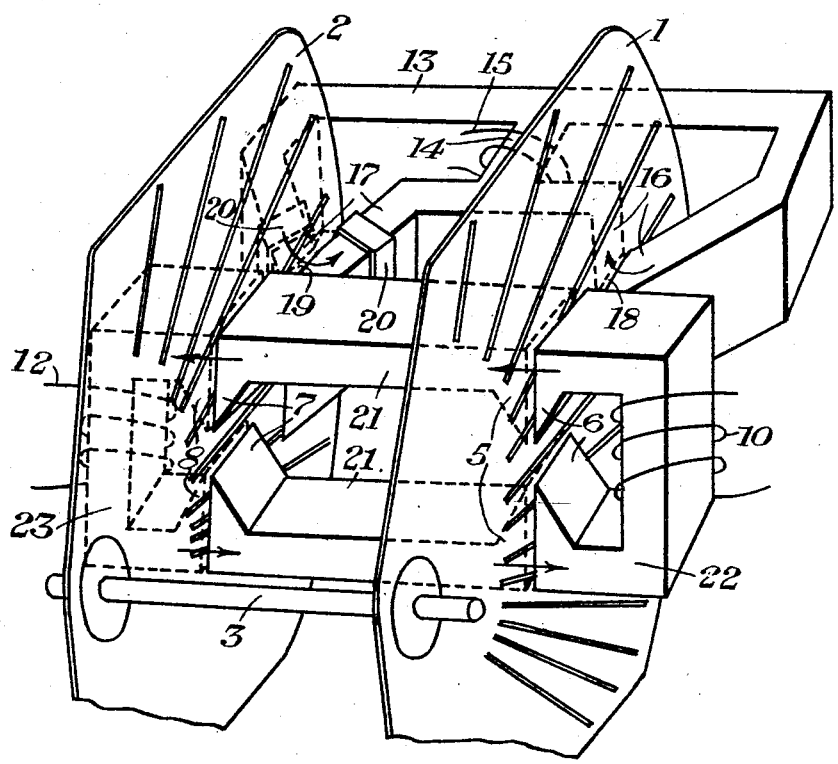
Fig. 3 is a perspective view of a modified form and Figs. 4 and 5 are views in front elevation of different portions of a still further modification.

Referring now to the modified construction shown in Fig. 3 the two vane segments 1, 2 are in this case mounted parallel and opposite to one another at different points in the length of the common rotatable spindle 3. The local magnetic core is constituted by a central pair of core elements 21 located between the two vane segments 1, 2 provided with pairs of poles 5, 7 arranged adjacent to the inner faces of the vane segments 1, 2.

The magnetic circuit of the local core is completed by outer core elements 22, 23 arranged on the outer side of the vane segments 1, 2, respectively, and comprising pairs of poles 6, 8 opposite to the poles 5, 7 of the central core elements 21. The energizing windings 10, 12 are arranged on the yokes of the core elements 22, 23, respectively, while the track core 13 is constituted by a common yoke 14 carrying winding 15 and two pairs of opposing poles 16, 17 embracing the radially outer portion of the vane segments 1, 2 and separated therefrom by air gaps 18, 19 of different dimensions. The poles 17 separated by smaller air gap 19 are provided with shading bands or conductors 20 as in the construction previously described.

The action of this form of relay is substantially the same as that of the construction shown in Figs. 1 and 2 and need not therefore be explained in detail.

Figure 4:
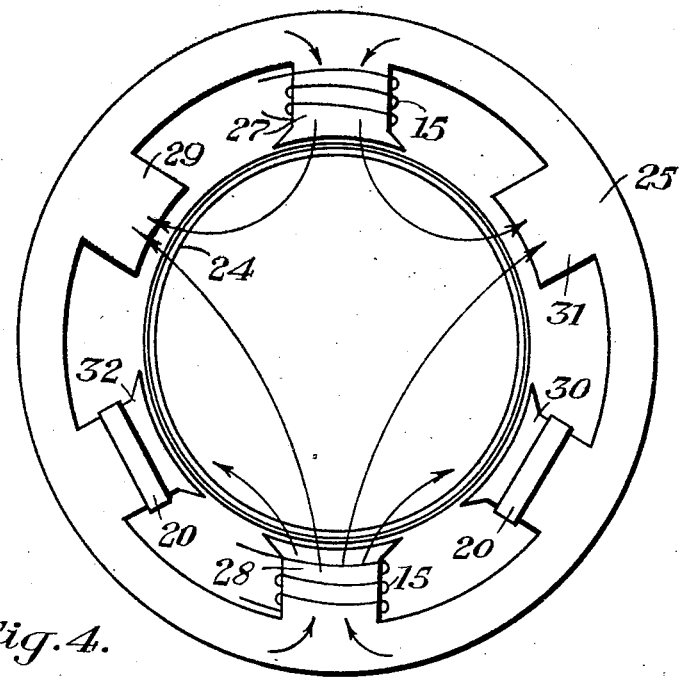
Figure 5:
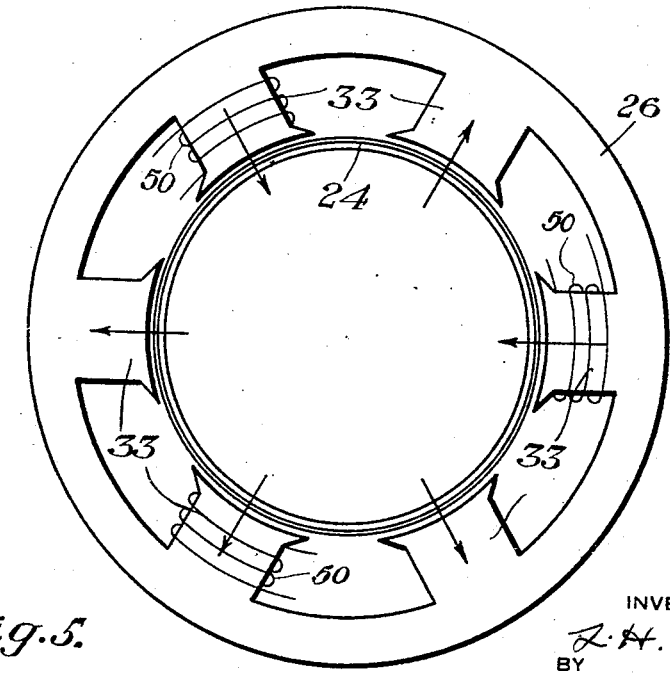

Referring now to the further modification shown in Figs. 4 and 5, the relay is in this form constituted by a light slotted cylinder 24, different portions of the axial length of which are, as shown in Figs. 4 and 5, surrounded by two rings of poles formed on corresponding magnetic cores 25 and 26 respectively. The track core 25 is provided with six equally spaced poles, of which two diametrically opposite poles 27 and 28 are provided with energizing windings 15. As regards the other pairs 29, 30 and 31, 32 of diametrically opposite poles one pole 29, 31 of each pair is separated from the cylindrical element 24 by a larger air gap than the other, the other poles 30, 32 being each provided with a shading band or conductor 20. The local core 26 is also provided with six equally spaced poles 33, each separated from the cylindrical element 24 by a uniform air gap, the poles 33 on the local core being, however, arranged to be angularly intermediate the poles on the track core 25, as will be seen by comparing Figs. 4 and 5. Each alternate pole 33 is provided with an energizing winding 50, and the relative instantaneous directions of the magnetic flux in the poles of the track and local cores are indicated by the arrows. In this construction the flux traversing the poles 33 of the local core induces currents in the cylindrical conductor 24, which under the action of the flux traversing the poles of the track core tend to cause rotation of the cylindrical element as will be readily understood, the magnetic fluxes due to the energizing windings 15 on the track core traversing the poles 29, 31 on this core provided with the larger air gaps, or the pair of poles 30, 32 provided with the smaller air gaps, to an extent depending upon the frequency of the energizing current so that, as in the constructions previously described, the opposing torques upon the cylindrical element 24 are balanced for a particular frequency of the energizing current, one of these torques becoming predominant over the other for energizing currents of a higher frequency than the predetermined frequency.

It will thus be seen that the invention provides an alternating current relay which is unresponsive to energizing current of a predetermined frequency without involving any continuously moving parts and owing to the fact that the induced currents in the vane or cylinder element of the relay assist the action of the shading bands or conductors in reducing the flux traversing the movable element the loss of power in the shading bands or conductors is correspondingly reduced.

My invention can evidently be carried into practice in a variety of other ways than those above described and is thus not limited to any particular constructional form or arrangement of the various elements thereof.

Having now particularly described and ascertained the nature of my said invention and in what manner the same is to be performed, I declare that what I claim is:

1. A relay comprising two separate magnetic circuits, two windings one for creating an alternating magnetic flux in each said circuit, and a movable member controlled jointly by the fluxes in said circuits and arranged to be operated only when the flux in one of said circuits is above a predetermined frequency.

2. A relay comprising a first magnetic circuit including an air gap, means for creating an alternating magnetic flux in said first circuit, two other magnetic circuits each including an air gap and having a common yoke, means located on the common yoke for creating an alternating magnetic flux which divides between said two other magnetic circuits in accordance with the frequency of such flux, and a movable member controlled by the joint action of the fluxes in said three air gaps.

3. A relay comprising a first magnetic circuit including an air gap, means for creating an alternating magnetic flux in said first circuit, two other magnetic circuits each including an air gap and having a common yoke, means located on the common yoke for creating an alternating magnetic flux which divides between said two other magnetic circuits in accordance with the frequency of such flux, and a movable member controlled by the joint action of the fluxes in the three air gaps and responsive to the distribution of the flux between said two other magnetic circuits.

4. A relay comprising a first magnetic circuit, a first winding for creating an alternating magnetic flux in the first circuit, two other magnetic circuits having a common yoke, a second winding on the common yoke for creating an alternating magnetic flux which divides between said two other magnetic circuits in accordance with the frequency of such flux, and a movable member controlled by the joint action of the fluxes in said three magnetic circuits.

In testimony whereof I affix my signature.

LESLIE HURST PETER.